United States Patent [19]

Tschernuth

[11] Patent Number: 5,741,379

[45] Date of Patent: Apr. 21, 1998

US005741379A

[54] PROCESS FOR PREPARING AN INSULATING BOARD

[75] Inventor: Christof Tschernuth, Villach, Austria

[73] Assignee: Heraklith Baustoffe AG, Furnitz, Austria

[21] Appl. No.: 503,680

[22] Filed: Jul. 18, 1995

[30] Foreign Application Priority Data

Jul. 19, 1994 [DE] Germany .................. 44 25 472.5
Sep. 30, 1994 [DE] Germany .................. 44 34 991.2

[51] Int. Cl.$^6$ ........................................... B27N 3/00
[52] U.S. Cl. ................... 156/62.6; 156/204; 427/394; 427/424
[58] Field of Search ..................... 427/394, 424; 156/204, 62.6

[56] References Cited

U.S. PATENT DOCUMENTS 5,178,680  1/1993  Tenney et al. ................... 118/315

FOREIGN PATENT DOCUMENTS

528348 A1  2/1993  European Pat. Off. ......... D04H 1/74

*Primary Examiner*—Christopher Raimund
*Attorney, Agent, or Firm*—John F. A. Earley; John F. A. Earley, III; Harding, Earley, Follmer & Frailey

[57] ABSTRACT

The present invention pertains to an insulation board made of a secondary mat formed by multiply folding a primary mat, characterized in that the primary mat has a coating of an impregnating agent at least on one side.

6 Claims, 1 Drawing Sheet

PROCESS FOR PREPARING AN INSULATING BOARD

SPECIFICATION

The present invention pertains to an insulation board as well as to a process for preparing an insulation board, specifically an impregnated insulation board.

The term "insulation board" means all insulating materials which have a defined shape, as opposed to a loose bulk material, liquids or the like.

Such insulation boards (insulation slabs) based on mineral fibers have belonged to the state of the art for many years and have proved successful in the building trade.

Increasing attention has again been paid recently to insulating materials based on plant or animal fibers. Problems arise in connection with, e.g., their behavior in fire and their biological resistance.

Insulating materials made from the said fiber materials must therefore be provided with a corresponding impregnation if they are to meet certain requirements in terms of behavior in fire or the resistance to a biological attack, e.g., insects.

The mobility of insects requires that the impregnating agent be distributed as uniformly as possible over the volume of the product. It has been known in this connection that the insulation board in question can be sprayed with the impregnating agent, or the impregnating agent can be made into a foam and be applied to the insulation board. These techniques can be used on very thin mats only because of the weak tendency to penetrate. In the case of thicker mats, impregnation takes place almost exclusively only in the surface area, which is, as was shown, insufficient. Additional "impregnation gaps" are also formed on cut surfaces (formed during the subsequent processing).

Through-impregnation, e.g., by immersing an insulation board into an impregnating bath would, in principle, be possible. However, such a process would be very expensive, and the insulation board would subsequently have to be dried with a considerable amount of energy.

The desired through-impregnation would, in principle, also be able to be achieved by treating the flock (e.g., a flock of cotton, flax or sheep's wool) prior to the carding (i.e., before the formation of the primary mat). The essential disadvantage of this process is the fact that the insulating material is subjected to a considerable mechanical load during the carding process. Experiments have shown that up to 90% of the impregnating agents are again mechanically separated as a result. The result would be an insulation board with completely insufficient impregnation. At the same time, the machinery is contaminated by the separated impregnating agent.

The basic task of the present invention is therefore to provide an insulation board in which the impregnating agent is distributed so as to ensure more or less uniform properties over its entire volume, and the product can be prepared in a very simple process.

The present invention is based on the following finding: Based on a prior-art process, in which fibers (flocks) are first processed into a primary mat and subsequently further processed into a secondary mat by shaping the primary mat, the present invention provides for subjecting the primary mat to an impregnation treatment before shaping into the secondary mat, wherein the impregnating agent is preferably sprayed in the liquid form as a mist onto at least one side of the primary mat. An alternative application of the impregnating agent is characterized in that an impregnating foam is applied to the primary mat and consequently also into the primary mat over a certain depth.

The process according to which the impregnating agent is applied to the primary mat represents a very essential basic idea of the invention.

Conventional spraying processes, with which, e.g., binding agents are sprayed onto fibers, are characterized by a relatively large drop diameter. Consequently, such an impregnation process would lead only to a partial impregnation of the primary mat.

Figure 1:
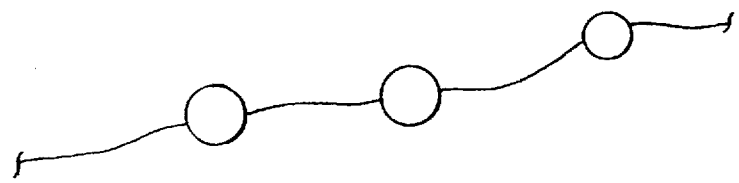
FIG. 1 depicts a fiber coated with a conventional spraying process wherein the droplets on the fiber surface have relatively large diameters and are arranged at great distances from one another.

FIG. 1 enclosed shows a highly schematic representation of a fiber surface, on which individual impregnating droplets, which will form a corresponding impregnating coating after a drying process, are arranged at great distances from one another.

Figure 2:
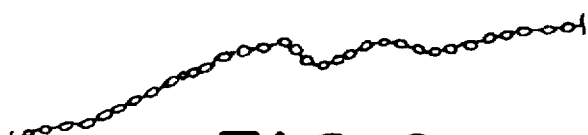
FIG. 2 depicts a fiber coated by the process of the present invention wherein the droplets are very fine and relatively close together.

In contrast, the present invention provides for spraying on the impregnating agent in the liquid form as a mist, i.e., for processing the impregnating agent in the form of an aerosol. Very fine liquid particles in a corresponding carrier gas (usually air) are thus brought to the primary mat, and the mist can not only precipitate there on the side of the primary mat adjacent to the spraying device, but it can also penetrate, in a highly advantageous manner, into the very loose and "porous skeleton" of the primary mat and cover the individual fibers there. One very important aspect is additionally the fact that the individual liquid particles are markedly smaller than in prior-art spraying processes, as is expressed by the term "mist" or "aerosol," so that very fine liquid droplets are precipitated one next to the other on the corresponding fiber surfaces, as is shown in FIG. 2 in a highly schematic form.

Even though individual liquid droplets are sprayed, a nearly closed (continuous) impregnation layer, which is also markedly superior to the process according to the state of the art in terms of its effectiveness, is obtained in the end after drying.

The much smaller liquid particles, which are applied to the primary mat via the spray mist, offer the additional advantage of being able to be dried much more rapidly, so that problems during the further processing can be avoided. This applies especially to the further processing of the primary mat into the secondary mat. If, e.g., a pendulum is used, as is known from EP 0 528 348 A1, the primary mat must be more or less dry, because it would otherwise stick to the surfaces of the conveyor belts of the pendulum.

Figure 3:
FIG. 3 depicts a fiber coated with a foam impregnating agent or, alternatively, with a mist wherein the surface tension of the aerosol is such that the coating wets the fiber surface.

The surface tension of the aerosol may also be set such that larger coating sections will be formed on the individual fibers, as it is schematically represented in FIG. 3. A similar coating pattern is also obtained when the impregnating agent is applied as a foam. This may be carried out under pressure, but also under vacuum (from below).

The new process described here makes it possible either to completely eliminate the need for a separate drying station (because air drying of the primary mat on the way to the further processing into the secondary mat is already sufficient), or at least to make a drying station much shorter and simpler, because much smaller liquid particles are to be dried.

According to one embodiment, the primary mat is correspondingly dried after the impregnation treatment, but before the further processing.

The further processing can be carried out via a pendulum, as it is specifically described in EP 0 528 348 A1.

The impregnation treatment is preferably carried out on a primary mat (web) with a basis weight between 30 and 90 $g/m^2$. Experiments have shown that nearly complete through-impregnation of the primary mat and consequently also of the insulation board formed from the primary mat is possible in the case of such mats.

Since the impregnating agent is applied from the outside, the concentration of the coating agent (considered at right angles to the direction of spraying in different planes) inherently progressively decreases in the direction of spraying.

This ultimately leads to an insulation board consisting of a secondary mat formed by multiply folding a primary mat, in which the primary mat has a coating consisting of an impregnating agent, which is the object of claim 1, at least on one side.

"On one side" means that after processing into the secondary mat and subsequent compression, the primary mat assumes a "flat shape," in which the impregnating agent concentration is highest according to the above explanations.

The insulation board, which is made of individual layers (primary mat), is nevertheless thoroughly impregnated by the technique described, so that, depending on the impregnating agent used, it is possible to reach higher fire classifications and to meet increased requirements on resistance to insect infestation.

The primary mat may, of course, also be sprayed on both sides, as a result of which it is possible, above all, to increase the concentration of the impregnating agent. However, the volume-related concentration of impregnating agent in the primary mat will always decrease from the outside to the inside in this case as well, and the concentration will increase somewhat at the most in the center, if the impregnation is carried out from both sides.

If the impregnating agent is sprayed as a mist, the individual impregnation surfaces (after drying) may be very small, as is schematically shown in FIG. 2, and their size may equal less than 0.1 $mm^2$ and preferably less than 0.01 $mm^2$ according to one embodiment. The corresponding droplet diameter should be correspondingly smaller than the mean diameter of the fibers being impregnated. The high concentration of liquid particles in the mist makes it ultimately possible to maintain the distances between individual liquid droplets or between the impregnation surfaces after drying very small, or even to obtain smaller, contiguous coating surfaces from individual droplets, and to obtain an impregnation coating that is nearly continuous in its outside appearance.

The mean droplet diameter according to the present invention is at least one power of ten lower than in the case of the comparable processes discussed above.

As is shown, the individual fibers can also be coated completely by changing the surface tension of the aerosol-type impregnating agent. The desired effect is maintained without any change.

Experiments have shown that the amount of impregnating agent can be reduced, with equal results, by up to 90% compared with prior-art impregnation processes by making the described change in the spray pattern. Spraying devices with which liquids (here: liquid impregnating agents) can be sprayed in the form of a mist have been known from the state of the art, but they have been known for other applications, e.g., for applying paint or for glazing ceramic parts. The sprayed liquid is disintegrated in the spray nozzle into very fine droplets, which are subsequently precipitated on the fibers and lead to a type of "dense carpet" there (so-called air-brush process).

I claim:

1. A process for preparing an insulation board, in which fibers are first processed into a primary mat and subsequently further processed into a secondary mat by multiple folding the primary mat and in which the fibers are impregnated with an impregnating agent, characterized in that the primary mat is subjected to an impregnation treatment prior to the multiple folding into the secondary mat, wherein the impregnating agent is sprayed in the liquid form as a mist onto both sides of the primary mat.

2. Process in accordance with claim 1, including drying the primary mat sprayed with the impregnating agent before the further multiply folding into the secondary mat.

3. Process in accordance with claim 1, in which the primary mat is multiply folded into a secondary mat via a pendulum.

4. Process for preparing an insulation board, in which fibers are first processed into a primary mat and subsequently further multiply folded into a secondary mat by multiply folding the primary mat and in which the fibers are impregnated, characterized in that the primary mat is subjected to an impregnation treatment on at least one side of the primary mat to form an impregnated side prior to the multiply folding into the secondary mat, wherein the impregnating agent is sprayed in the liquid form as a mist onto at least one side of the primary mat, or it is applied onto and into the primary mat as a foam, in which the primary mat with the impregnating agent is dried before the further multiply folding into the secondary mat, in which the primary mat is multiply folded into a secondary mat via a pendulum, and in which the foam impregnation is carried out under pressure or vacuum.

5. Process for preparing an insulation board, in which fibers are first processed into a primary mat and subsequently further processed into a secondary mat by multiple folding the primary mat and in which the fibers are impregnated, characterized in that the primary mat is subjected to an impregnation treatment on at least one side of the primary mat to form an impregnated side prior to the multiple folding into the secondary mat, wherein the impregnating agent is applied onto and into the primary mat as a foam.

6. Process in accordance with claim 5, in which the foam impregnation is carried out under pressure or vacuum.

* * * * *